(12) United States Patent
Kitano et al.

(10) Patent No.: US 12,410,896 B2
(45) Date of Patent: Sep. 9, 2025

(54) LIGHT SYSTEM

(71) Applicant: Panasonic Intellectual Property Management Co., Ltd., Osaka (JP)

(72) Inventors: Hiroshi Kitano, Hyogo (JP); Taisuke Nishimori, Osaka (JP); Tsuyoshi Morizumi, Osaka (JP); Kenichiro Tanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/844,853

(22) PCT Filed: Feb. 22, 2023

(86) PCT No.: PCT/JP2023/006420
§ 371 (c)(1),
(2) Date: Sep. 6, 2024

(87) PCT Pub. No.: WO2023/171386
PCT Pub. Date: Sep. 14, 2023

(65) Prior Publication Data
US 2025/0189089 A1    Jun. 12, 2025

(30) Foreign Application Priority Data
Mar. 11, 2022  (JP) ................... 2022-038587

(51) Int. Cl.
*F21S 9/03*    (2006.01)
*F21S 8/04*    (2006.01)
*F21S 41/16*   (2018.01)
*F21Y 115/30*  (2016.01)

(52) U.S. Cl.
CPC . *F21S 9/03* (2013.01); *F21S 8/04* (2013.01); *F21S 41/16* (2018.01); *F21Y 2115/30* (2016.08)

(58) Field of Classification Search
CPC ..... F21S 9/03; F21S 41/16; F21S 8/04; F21Y 2115/30
See application file for complete search history.

(56) References Cited

U.S. PATENT DOCUMENTS

2023/0151936 A1    5/2023  Kitano et al.

FOREIGN PATENT DOCUMENTS

| JP | 2019-009062 A | 1/2019 |
| JP | 2019-016510 A | 1/2019 |
| JP | 2020-099122 A | 6/2020 |
| WO | 2021/200128 A1 | 10/2021 |
| WO | WO-2021255981 A1 * | 12/2021 |

OTHER PUBLICATIONS

International Search Report dated Apr. 4, 2023 issued in International Patent Application No. PCT/JP2023/006420, with English translation.

* cited by examiner

*Primary Examiner* — Sean P Gramling
(74) *Attorney, Agent, or Firm* — Rimon P.C.

(57) ABSTRACT

A light system includes a light source unit including a laser light source, and a photoelectric transducer having the ability to generate photovoltaic power. The photoelectric transducer generates the photovoltaic power when receiving power feed light emerging from the light source unit. The light source unit may cause the power feed light and light for lighting for lighting up a target space to emerge from the light source unit itself. The power feed light is to be incident on the photoelectric transducer.

9 Claims, 12 Drawing Sheets

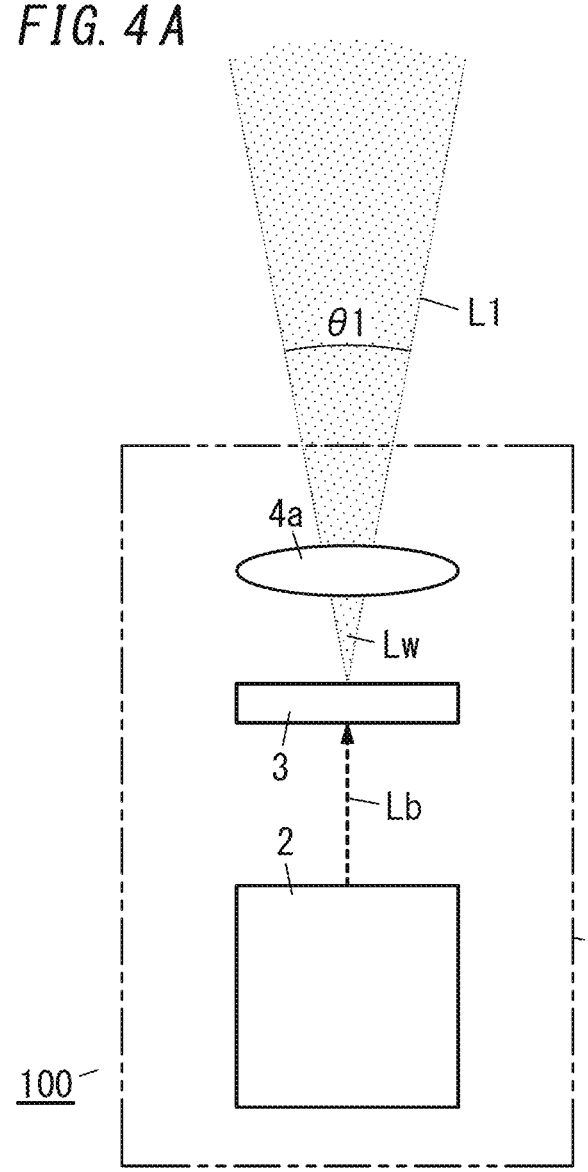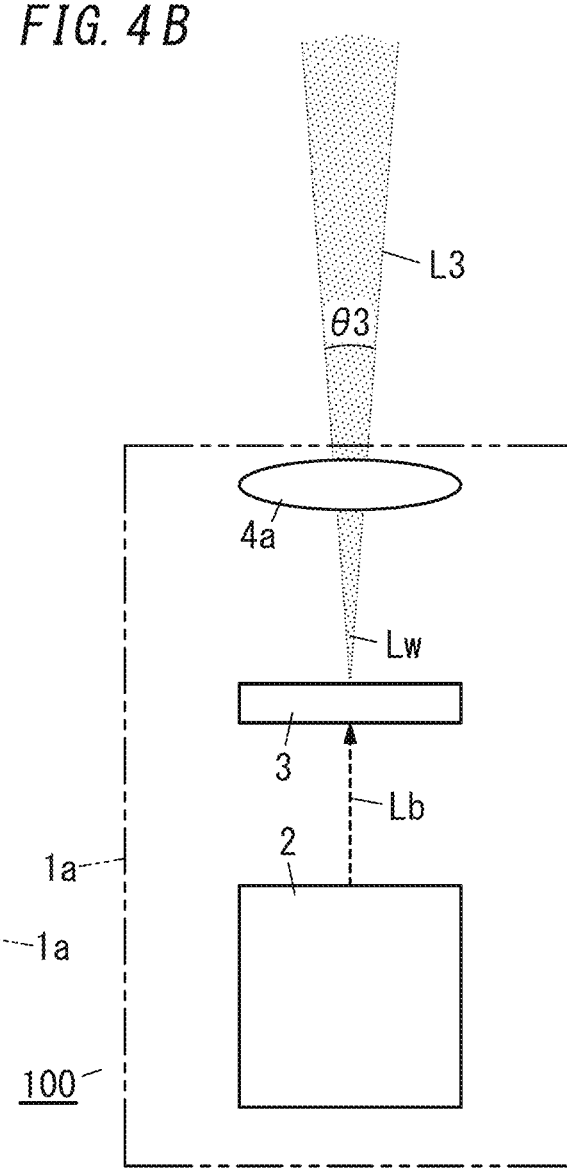

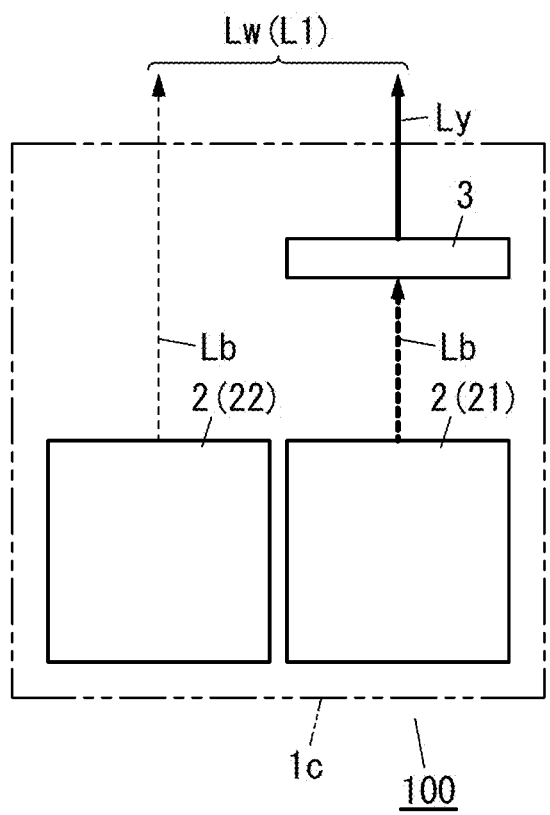 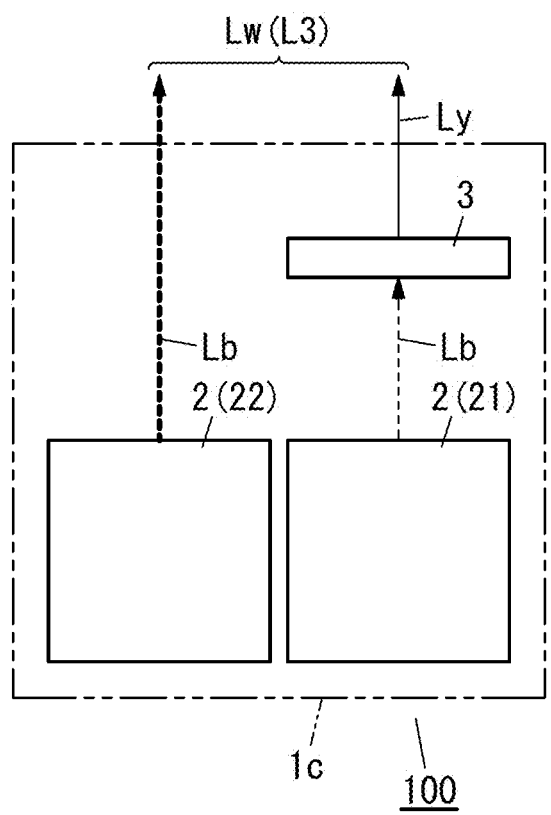

LIGHT SYSTEM

CROSS-REFERENCE OF RELATED APPLICATIONS

This application is the U.S. National Phase under 35 U.S.C. § 371 of International Patent Application No. PCT/JP2023/006420, filed on Feb. 22, 2023, which in turn claims the benefit of Japanese Patent Application No. 2022-038587, filed on Mar. 11, 2022, the entire disclosures of which Applications are incorporated by reference herein.

TECHNICAL FIELD

The present disclosure generally relates to a light system. More particularly, the present disclosure relates to a light system including a laser light source.

BACKGROUND ART

Patent Literature 1 discloses an optical wireless power transmission system. The optical wireless power transmission system of Patent Literature 1 includes a light source unit and a photodetector unit. The light source unit includes a laser light source. The light source unit emits a light ray to a propagation region (space). The photodetector unit receives the light ray transmitted from the light source unit which has propagated through the propagation region and transforms the light ray into electric power. The photodetector unit includes a photoelectric transducer element for transforming the light ray into electric power.

The optical wireless power transmission system of Patent Literature 1 is used only for the purpose of supplying power wirelessly.

CITATION LIST

Patent Literature

Patent Literature 1: JP 2020-99122 A

SUMMARY OF INVENTION

An object of the present disclosure is to provide a light system with the ability to make both optical wireless power transmission and lighting.

A light system according to an aspect of the present disclosure includes a light source unit including a laser light source, and a photoelectric transducer having the ability to generate photovoltaic power. The photoelectric transducer generates the photovoltaic power when receiving power feed light emerging from the light source unit. The light source unit may cause the power feed light and light for lighting for lighting up a target space to emerge from the light source unit itself. The power feed light is to be incident on the photoelectric transducer.

BRIEF DESCRIPTION OF DRAWINGS

FIG. 4A illustrates the light distribution angle of light for lighting emerging from a light source unit included in a light system according to a second embodiment;

FIG. 4B illustrates the light distribution angle of power feed light emerging from the light source unit of the light system;

FIG. 8A illustrates light for lighting emerging from a light source unit in a light system according to a fifth embodiment;

FIG. 8B illustrates power feed light emerging from the light source unit of the light system;

DESCRIPTION OF EMBODIMENTS

The drawings to be referred to in the following description of embodiments and their variations are all schematic representations. Thus, the ratio of the dimensions (including thicknesses) of respective constituent elements illustrated on the drawings does not always reflect their actual dimensional ratio.

First Embodiment

A light system 100 according to a first embodiment will now be described with reference to FIGS. 1, 2, 3A, and 3B.

(1) Overview

The light system 100 is a system which includes, for example, a light source unit 1 including a laser light source 2 and which may be used for both optical wireless power transmission and lighting up a target space S1. The target space S1 may be, for example, a space in a facility. The facility may be, for example, an office building. Examples of other facilities include single-family dwelling houses, multi-family dwelling houses, stores, art museums, hotels, factories, athletic stadiums, and airports.

(2) Configuration for Light System

Figure 1:
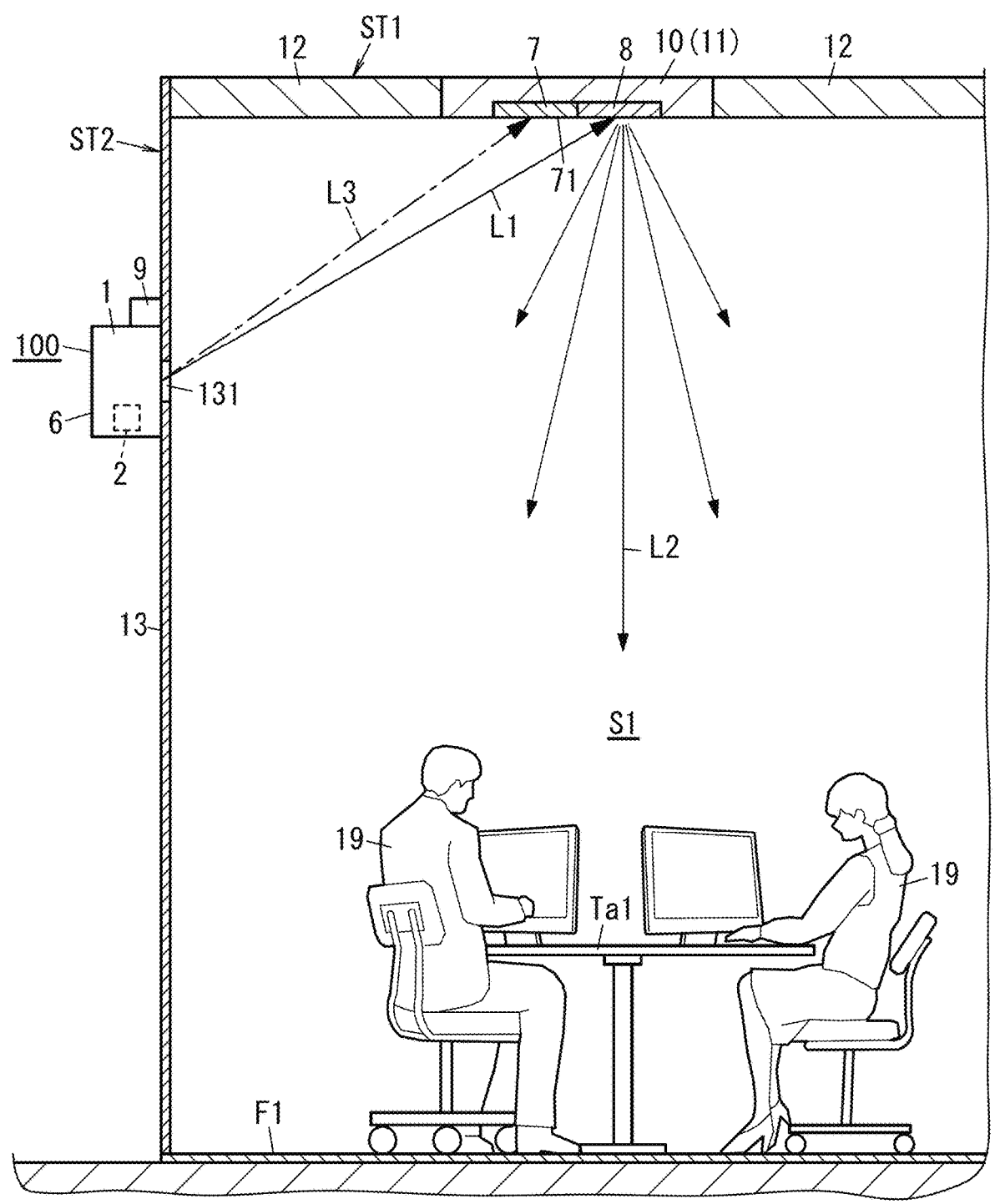
FIG. 1 illustrates a configuration for a light system according to a first embodiment.

As shown in FIG. 1, the light system 100 includes the light source unit 1 and a photoelectric transducer 7. The light source unit 1 includes a laser light source 2. The photoelectric transducer 7 may generate photovoltaic power. The photoelectric transducer 7 generates the photovoltaic power when receiving power feed light L3 emerging from the light source unit 1. The light source unit 1 may cause the power feed light L3 to be incident on the photoelectric transducer 7 and light for lighting L1 for lighting up the target space S1 to emerge from the light source unit 1 itself. The light system 100 further includes a light-distributing member 8. The light-distributing member 8 reflects at least a part of the light for lighting L1 and thereby transforms at least the part of the light for lighting L1 into lighting light L2 having a different light distribution characteristic from the light for lighting L1 to have the lighting light L2 distributed over the target space S1. The light system 100 makes a beam of the light for lighting L1 (e.g., a beam of white light), emerging from the light source unit 1, incident as incoming light on the light-distributing member 8 and causes the light-distributing member 8 to transform the incoming light (i.e., the light for lighting L1) into lighting light L2 and project the lighting light L2.

The light system 100 further includes a holding member 10 which holds the photoelectric transducer 7 and the light-distributing member 8. The light system 100 further includes a control unit 9 which controls the light source unit 1. The control unit 9 has the functions of: controlling the light source unit 1 to cause only the power feed light L3 to emerge from the light source unit 1 out of the power feed light L3 and the light for lighting L1; and controlling the light source unit 1 to cause only the light for lighting L1 to emerge from the light source unit 1 out of the power feed light L3 and the light for lighting L1.

(2.1) Light Source Unit

The light source unit 1 includes a laser light source 2. The laser light source 2 may be, for example, a semiconductor laser diode which emits blue light Lb (refer to FIG. 2) as a laser beam. Thus, the blue light Lb is emitted from the laser light source 2. The semiconductor laser diode may be, for example, a GaN-based semiconductor laser diode. The laser beam may have a peak wavelength falling within, for example, the range equal to or longer than 440 nm and equal to or shorter than 480 nm.

The light source unit 1 further includes a wavelength-converting member 3, a lens 4, a mirror 5, and a housing 6 (refer to FIG. 1).

In the light source unit 1, the blue light Lb emitted from the laser light source 2 is incident on the wavelength-converting member 3. The wavelength-converting member 3 has the function of transforming the blue light Lb into white light Lw including a light component with a different wavelength from the blue light Lb.

The wavelength-converting member 3 may include, for example, a light-transmitting material portion and phosphor particles. In this case, the wavelength-converting member 3 is formed as a mixture of the light-transmitting material portion and the phosphor particles. In the wavelength-converting member 3, there are a great number of phosphor particles in the light-transmitting material portion. A material for the light-transmitting material portion (i.e., light-transmitting material) is preferably a material which has high transmittance to visible light. The light-transmitting material may be, for example, a silicone-based resin. This allows the light source unit 1 to improve the heat resistance and weather resistance of the wavelength-converting member 3. Examples of the "silicone-based resin" include silicone resin and modified silicone resin. The wavelength-converting member 3 includes phosphor particles as a wavelength-converting element. The wavelength-converting element converts the wavelength of a part of the blue light Lb to radiate light having a different wavelength from the blue light Lb. As the phosphor particles, yellow phosphor particles which radiate yellow light may be adopted, for example. The light (fluorescence) radiated from the yellow phosphor particles preferably has an emission spectrum having a primary emission peak wavelength in a wavelength range equal to or longer than 530 nm and equal to or shorter than 580 nm, for example. The yellow phosphor particles may be, but does not have to be, $Y_3Al_5O_2$ activated with Ce. The white light Lw emerging from the wavelength-converting member 3 is a mixture of the blue light Lb and the yellow light.

The wavelength-converting member 3 does not have to include only the yellow phosphor particles as the wavelength-converting element but may include the yellow phosphor particles, yellow-green phosphor particles, green phosphor particles, and red phosphor particles. That is to say, the wavelength-converting member 3 may include multiple types of phosphor particles.

The white light Lw emerging from the wavelength-converting member 3 is incoherent light.

The lens 4 is provided opposite from the laser light source 2 with respect to the wavelength-converting member 3. The lens 4 collimates the white light Lw emerging from the wavelength-converting member 3.

The mirror 5 is a scanning mirror which may scan the projection direction of the white light Lw emerging from the lens 4. In the light system 100 according to the first embodiment, the white light Lw reflected from the mirror 5 toward the light-distributing member 8 (refer to FIG. 1) is the light for lighting L1, while the white light Lw reflected from the mirror 5 toward the photoelectric transducer 7 (refer to FIG. 1) is the power feed light L3. The mirror 5 may be controlled by, for example, the control unit 9. The control unit 9 controls the mirror 5 to make the white light Lw emerging from the light source unit 1 either the light for lighting L1 traveling toward the light-distributing member 8 or the power feed light L3 traveling toward the photoelectric transducer 7. The mirror 5 may be, but does not have to be, a micro-electro-mechanical systems (MEMS) mirror. Alternatively, the mirror 5 may also be a polygon mirror, for example.

The housing 6 (refer to FIG. 1) houses the laser light source 2, the wavelength-converting member 3, the lens 4, and the mirror 5. The housing 6 includes a light emerging portion, through which the white light Lw is projected toward the target space S1. The light emerging portion may be made of a light transmitting material. The light transmitting material may be, for example, optical glass. The light transmitting material is preferably a material which has high transmittance to visible light. The light emerging portion of the housing may be an opening.

As shown in FIG. 1, the light source unit 1 may be disposed behind a second structure ST2, out of a first structure ST1 and the second structure ST2 which define the target space S1 in the facility. The first structure ST1 is the ceiling of the facility and includes a plurality of first building components (ceiling members) 12 facing the target space S1. Each of the plurality of first building components 12 has the shape of a panel. Meanwhile, the second structure ST2 is a wall of the facility and includes a plurality of second building components 13 (only one of which is shown in FIG. 1) facing the target space S1. Each of the plurality of second building components 13 has the shape of a panel. As used herein, the phrase "facing the target space S1," means being in contact with the target space S1. The first structure ST1 is in contact with the target space S1 to define a boundary between the target space S1 and the space above the ceiling. The target space S1 is the space under the ceiling. The second structure ST2 is in contact with the target space S1 to define the boundary between the target space S1 and the space behind the wall. When one of the plurality of second building components 13 is viewed from a person 19 present in the target space S1, the light source unit 1 is hidden behind the second building component 13. In other words, the light source unit 1 is hidden behind the second building component 13.

In this embodiment, the light source unit 1 is disposed opposite from the target space S1 with respect to one second building component 13 out of the plurality of second building components 13. However, this is only an example and should not be construed as limiting. Alternatively, the light source unit 1 may also be disposed inside the one second building component 13. The one second building component 13 has a window 131 which allows the power feed light L3 and the light for lighting L1 emerging from the light source unit 1 to pass therethrough. In this embodiment, the window 131 is an opening. However, this is only an example and should not be construed as limiting. Alternatively, the window 131 may also be a member with light transmitting property.

The light source unit 1 is disposed at a point on the second building component 13 where the height as measured from a floor surface F1 is equal to or greater than a predetermined height (of 2 meters, for example). The predetermined height is determined such that the light emerging portion of the housing 6 of the light source unit 1 is located at a level higher than the eyes of a person 19 as measured from a floor surface F1. In addition, the light source unit 1 is arranged to cause the power feed light L3 and the light for lighting L1 to travel upward with respect to the horizontal direction (i.e., diagonally upward), not downward with respect to the horizontal direction.

(2.2) Photoelectric Transducer

The photoelectric transducer 7 is separated from the light source unit 1. The photoelectric transducer 7 receives the beam of the power feed light L3 emerging from the light source unit 1 toward the target space S1 to generate photovoltaic power.

The photoelectric transducer 7 may include, for example, a photovoltaic cell. The photovoltaic cell may be, for example, an Si-based photovoltaic cell (a-Si:H/c-Si heterojunction photovoltaic cell). The Si-based photovoltaic cell may include, for example, a substrate having a first principal surface and a second principal surface opposite from the first principal surface. The substrate is an n-type single crystal silicon substrate. The first principal surface of the substrate has a first texture structure. The second principal surface of the substrate has a second texture structure. The Si-based photovoltaic cell includes: a first i-type (intrinsic-type) hydrogenated amorphous silicon layer (hereinafter referred to as an "a-Si:H layer") formed on the first principal surface of the substrate; a p-type a-Si:H layer formed on the first i-type a-Si:H layer; a second i-type a-Si:H layer formed on the second principal surface of the substrate; and an n-type a-Si:H layer formed on the second i-type a-Si:H layer. The Si-based photovoltaic cell further includes: a first transparent electrode formed on the p-type a-Si:H layer; a first collector electrode formed on the first transparent electrode; a second transparent electrode formed on the n-type a-Si:H layer; and a second collector electrode formed on the second transparent electrode. The first texture structure and the second texture structure are microscopic uneven shapes provided for the purpose of reducing surface reflection loss and increasing the absorption of light due to light confinement effect. A material for each of the first and second transparent electrodes may be a transparent conductive oxide. The photovoltaic cell does not have to be the Si-based photovoltaic cell but may also be any other type of photovoltaic cell. The photoelectric transducer 7 has the shape of a panel and has a light incident surface 71 intersecting with the thickness direction defined for the photoelectric transducer 7. The photoelectric transducer 7 is arranged such that the light incident surface 71 faces the target space S1.

The photoelectric transducer 7 generates photovoltaic power when the power feed light L3 is incident on the light incident surface 71.

(2.3) Light-Distributing Member

The light-distributing member 8 is separated from the light source unit 1. The light-distributing member 8 has the function of reflecting the light for lighting L1 emerging as a beam of light from the light source unit 1. The light-distributing member 8 transforms the light for lighting L1 into lighting light L2 having a different light distribution characteristic from the light for lighting L1 and distributes the lighting light L2 over the target space S1. In this case, the lighting light L2 has a light distribution characteristic with a lower degree of directivity than the light for lighting L1. In other words, the lighting light L2 has a wider beam divergence angle than the light for lighting L1. Stated otherwise, the lighting light L2 has a broader light distribution than the light for lighting L1. The light-distributing member 8 diffuse-reflects the light for lighting L1, thereby transforming the light for lighting L1 into the lighting light L2 to be distributed over the target space S1. The light-distributing member 8 preferably has a property with a higher diffuse reflectance. This allows the light-distributing member 8 to decrease its light absorbance and increase its diffusivity. The light-distributing member 8 may be colored in white, which is one of preferred colors for the light-distributing member 8. The light-distributing member 8 is preferably non-glossy rather than being glossy. In other words, the light-distributing member 8 preferably has a high diffuse reflectance but has a low specular reflectance.

The light-distributing member 8 has a first function, a second function, and a third function. The first function is the function of reflecting the light for lighting L1 toward the target space S1. The second function is the function of transforming the light for lighting L1 into the lighting light L2. The third function is the function of delivering the lighting light L2 toward the target space S1. The lighting light L2 is light having a lower degree of coherence than the light for lighting L1. That is to say, the lighting light L2 is incoherent light.

In the facility, a table Ta1 to be used by, for example, the persons 19 as users of the facility is installed on the floor surface F1 to be located under the light-distributing member 8.

The light-distributing member 8 may include: a reflecting portion which reflects the light for lighting L1 toward the target space S1; and a diffusing portion which causes the light for lighting L1 to diffuse toward the target space S1. In that case, the reflecting portion may be, for example, a reflective layer. A material for the reflective layer includes a metal, for example. The metal may be, for example, aluminum or an aluminum alloy. The diffusing portion may be a transmissive diffuser. Examples of materials for the diffusing portion include polycarbonate, polyester, acrylic, glass, and quartz. The diffusing portion has the shape of a plate and has a first principal surface facing the reflecting portion and a second principal surface opposite from the reflecting portion. The diffusing portion is arranged such that the second principal surface of the diffusing portion faces the target space S1. The second principal surface of the diffusing portion has an uneven structure. The uneven structure includes a plurality of curved surfaces formed at random. The diffusing portion includes a plurality of microlenses provided for the respective curved surfaces. Each of the plurality of curved surfaces serves as the light emerging surface of its corresponding microlens. Thus, it can be said that the diffusing portion is a microlens array in which a plurality of microlenses are integrated together at random. The shape of the uneven structure has been determined based on a desired light distribution angle of the lighting light L2. The diffusing portion causes the light for lighting L1 which has been reflected from the reflecting portion to diffuse due to the refraction and diffraction actions caused by the uneven structure. The diffusing portion may be implemented as, for example, light shaping diffusers (LSD). In the light-distributing member 8, the light distribution angle of the lighting light L2 is determined by the uneven structure of the diffusing portion.

(2.4) Holding Member

As shown in FIG. 1, the holding member 10 holds the photoelectric transducer 7 and the light-distributing member 8. In this embodiment, the photoelectric transducer 7 and the light-distributing member 8 are adjacent to each other.

The holding member 10 may, for example, form part of the first structure ST1 facing the target space S1. In that case, the holding member 10 includes a ceiling member 11 facing the target space S1. The holding member 10 and at least one building component 12 belonging to the plurality of building components 12 may be arranged side by side, for example. The ceiling member 11 has the shape of a panel. The ceiling member 11 may have a square shape when viewed in a thickness direction defined for the ceiling member 11. However, this is only an example and should not be construed as limiting. Alternatively, the ceiling member 11 may also have a rectangular shape when viewed in the thickness direction. As used herein, the expression "when viewed in the thickness direction defined for the ceiling member" means viewing the ceiling member 11 from the target space S1 along the thickness of the ceiling member 11. The ceiling member 11 may have the same size as the first building component 12, for example, but may also have a different size from the first building component 12. The ceiling member 11, as well as the first building component 12, is supported by a grid-shaped supporting member provided for an integrated ceiling serving as the ceiling. The supporting member may be formed of, for example, a plurality of galvanized steel plates.

Each of the ceiling members 11 and the first building components 12 may be, for example, a decorative plywood board or a decorative board. Examples of the decorative plywood board include a natural wood decorative plywood board and a specially processed and overlaid decorative board. Examples of the specially processed and overlaid decorative board include synthetic resin decorative boards, printed plywood boards, vinyl chloride decorative boards, and paper or cloth overlaid plywood boards. Examples of the decorative board include medium density fiberboards (MDFs), Dailite, rock wool boards, calcium silicate boards, and insulation boards.

(2.5) Control Unit

The control unit 9 controls the light source unit 1. The control unit 9 has the functions of: controlling the light source unit 1 to cause only the power feed light L3 to emerge from the light source unit 1 out of the power feed light L3 and the light for lighting L1; and controlling the light source unit 1 to cause only the light for lighting L1 to emerge from the light source unit 1 out of the power feed light L3 and the light for lighting L1. The control unit 9 changes the emerging direction of the white light Lw by controlling the scanning angle of the mirror 5 of the light source unit 1. In this manner, the control unit 9 causes the white light Lw to emerge as either the power feed light L3 or the light for lighting L1. Thus, in the light system 100, the power feed light L3 and the light for lighting L1 have mutually different emerging directions.

The control unit 9 includes a computer system. The computer system may include a processor and a memory as principal hardware components thereof. The functions of the control unit 9 may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits such as an IC or an LSI include integrated circuits called a "system LSI," a "very-large-scale integrated circuit (VLSI)," and an "ultra-large-scale integrated circuit (ULSI)." Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

(2.6) Other Constituent Elements of Light System

The light system 100 may further include a power supply unit. The power supply unit supplies power to the laser light source 2 and other members. The power supply unit includes a driver circuit for driving the laser light source 2. The driver circuit may be controlled by the control unit 9, for example. In the light system 100, making the control unit 9 control the driver circuit allows the optical output of the laser light source 2 to be adjusted, thus making the illuminance (brightness) of the lighting light L2 adjustable as well. The power supply unit may be housed in the housing 6 of the light source unit 1, for example. However, the power supply unit does not have to be housed in the housing 6. A supply voltage is supplied to the power supply unit from an external power supply via a cable.

Alternatively, the light system 100 may include a power supply unit including a storage battery to be charged with the output of the photoelectric transducer 7. The light system 100 may further include a communications unit that transmits information about the level of the storage battery to the control unit 9. In that case, if the information received from the communications unit includes information indicating that the storage battery is fully charged in a state where the power feed light L3 is emerging from the light source unit 1, for example, then the control unit 9 may instruct that the power feed light L3 stop emerging from the light source unit 1.

(3) Operation of Light System

Figure 3A:
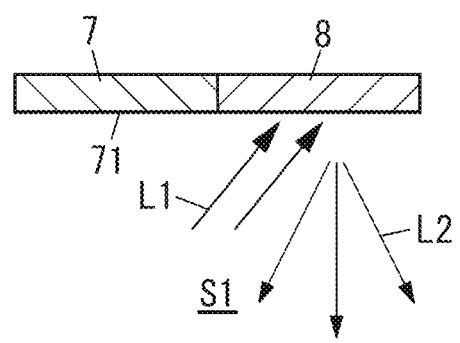
FIG. 3A illustrates light for lighting incident on a light-distributing member of the light system and lighting light distributed by the light-distributing member.
Figure 3B:
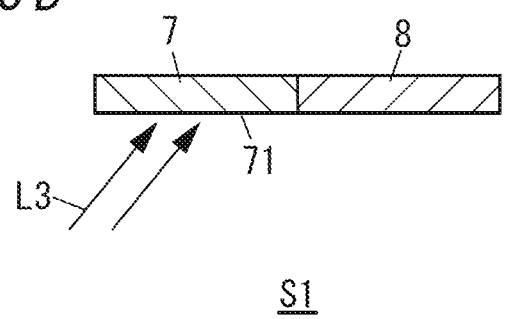
FIG. 3B illustrates power feed light incident on a photoelectric transducer in the light system.

The light system 100 causes the laser light source 2 of the light source unit 1 to emit the blue light Lb. In the light source unit 1 of the light system 100, the blue light Lb emitted from the laser light source 2 is incident on the wavelength-converting member 3, where part of the blue light Lb is transformed into yellow light. Thus, in the light source unit 1 of the light system 100, the blue light Lb emitted from the laser light source 2 is transformed by the wavelength-converting member 3 into white light Lw. The light source unit 1 makes the lens 4 collimate the white light Lw emerging from the wavelength-converting member 3 and has the white light Lw thus collimated reflected by the mirror 5 and projected toward the target space S1. The white light Lw emerging from the light source unit 1 travels through the target space S1 to be incident on either the photoelectric transducer 7 or the light-distributing member 8. The photoelectric transducer 7 generates photovoltaic power when receiving the power feed light L3. The light-distributing member 8 reflects the light for lighting L1, thereby causing lighting light L2, having a different light distribution characteristic from the light for lighting L1, to project toward the target space S1. The lighting light L2 is incoherent light with a low degree of directivity. When the control unit 9 causes the light for lighting L1 to emerge from the light source unit 1, the light for lighting L1 is incident on the light-distributing member 8 out of the photoelectric transducer 7 and the light-distributing member 8 and the light for lighting L1 is transformed by the light-distributing member 8 into the lighting light L2 as shown in FIG. 3A. On the other hand, when the control unit 9 causes only the power feed light L3 to emerge from the light source unit 1, the power feed light L3 is incident on the photoelectric transducer 7 out of the photoelectric transducer 7 and the light-distributing member 8 to cause the photoelectric transducer 7 to generate photovoltaic power as shown in FIG. 3B. This allows the photoelectric transducer 7 to generate photovoltaic power even when the target space S1 is not lighted up. In the light system 100 according to the first embodiment, the light for lighting L1 and the power feed light L3 emerge from the light source unit 1 in mutually different directions. However, the light for lighting L1 and the power feed light L3 have the same spectrum and have the same beam diameter.

(4) Recapitulation

A light system 100 according to the first embodiment includes a light source unit 1 including a laser light source 2, and a photoelectric transducer 7 having the ability to generate photovoltaic power. The photoelectric transducer 7 generates the photovoltaic power when receiving power feed light L3 emerging from the light source unit 1. The light source unit 1 may cause the power feed light L3 and light for lighting L1 for lighting up a target space S1 to emerge from the light source unit 1 itself. The power feed light L3 is to be incident on the photoelectric transducer 7.

The light system 100 according to the first embodiment may make both optical wireless power transmission and lighting. More specifically, the light system 100 according to the first embodiment allows, when the light source unit 1 causes the power feed light L3 to emerge therefrom, the photoelectric transducer 7 to generate photovoltaic power, thus enabling making optical wireless power transmission. On the other hand, when the light source unit 1 causes the light for lighting L1 to emerge therefrom, the light source unit 1 may provide lighting.

The light system 100 according to the first embodiment further includes a light-distributing member 8. The light-distributing member 8 reflects at least a part of the light for lighting L1 and thereby transforms at least the part of the light for lighting L1 into lighting light L2 having a different light distribution characteristic from the light for lighting L1 to have the lighting light L2 distributed over the target space S1. This allows the light system 100 according to the first embodiment to provide lighting light L2 with controlled light distribution for the target space S1 without using any lighting fixture. The light system 100 according to the first embodiment uses, as the light for lighting L1, light with a high degree of directivity (e.g., a beam of light suitable for propagating through a space over a long distance). In addition, in the light system 100, the lighting light L2 that has been transformed to be distributed by the light-distributing member 8 has a lower degree of directivity and a lower degree of coherence than the light for lighting L1, and therefore, is suitable for lighting. Furthermore, the light system 100 uses the laser light source 2 as the light source, and therefore, may increase the degree of directivity of the light for lighting L1 and allows the light source to be disposed more distant from the ceiling.

The light system 100 according to the first embodiment further includes a holding member 10 that holds the photoelectric transducer 7 and the light-distributing member 8. This allows the light system 100 according to the first embodiment to have relative positions of the photoelectric transducer 7 and the light-distributing member 8 determined by the holding member 10.

Furthermore, in the light system 100 according to the first embodiment, the photoelectric transducer 7 and the light-distributing member 8 are adjacent to each other. This allows the light system 100 according to the first embodiment to reduce the angle formed between the emerging direction of the power feed light L3 and the emerging direction of the light for lighting L1 compared to a situation where the photoelectric transducer 7 and the light-distributing member 8 are arranged so distant from each other to allow another member to be interposed between the photoelectric transducer 7 and the light-distributing member 8.

Furthermore, in the light system 100 according to the first embodiment, the holding member 10 includes a ceiling member 11 facing the target space S1. This allows the light system 100 according to the first embodiment to achieve the advantage of making it easier to light up the target space S1 with the lighting light L2 and providing a person 19 with natural lighting as the lighting light L2 without allowing him or her to find the lighting unnatural.

Furthermore, the light system 100 according to the first embodiment further include a control unit 9 that controls the light source unit 1. The control unit 9 has the functions of: controlling the light source unit 1 to cause only the power feed light L3 to emerge from the light source unit 1 out of the power feed light L3 and the light for lighting L1; and controlling the light source unit 1 to cause only the light for lighting L1 to emerge from the light source unit 1 out of the power feed light L3 and the light for lighting L1. This allows the light system 100 according to the first embodiment to change the control mode from the mode in which only the power feed light L3 is allowed to emerge from the light source unit 1 to the mode in which only the light for lighting L1 is allowed to emerge from the light source unit 1, and vice versa. Thus, the control of allowing only the power feed light L3 to emerge from the light source unit 1 and the control of allowing only the light for lighting L1 to emerge from the light source unit 1 may be performed in mutually different time slots.

Furthermore, in the light system 100 according to the first embodiment, the power feed light L3 and the light for lighting L1 have mutually different emerging directions. This allows the light system 100 according to the first embodiment to cause the power feed light L3 and the light for lighting L1 to emerge from the light source unit 1 as two different types of light suitable for their respective purposes.

Second Embodiment

A light system 100 according to a second embodiment includes a light source unit 1a (refer to FIGS. 4A and 4B) instead of the light source unit 1. The basic configuration of the light system 100 according to the second embodiment is the same as that of the light system 100 according to the first embodiment, and therefore, illustration and description thereof will be omitted herein.

Figure 2:
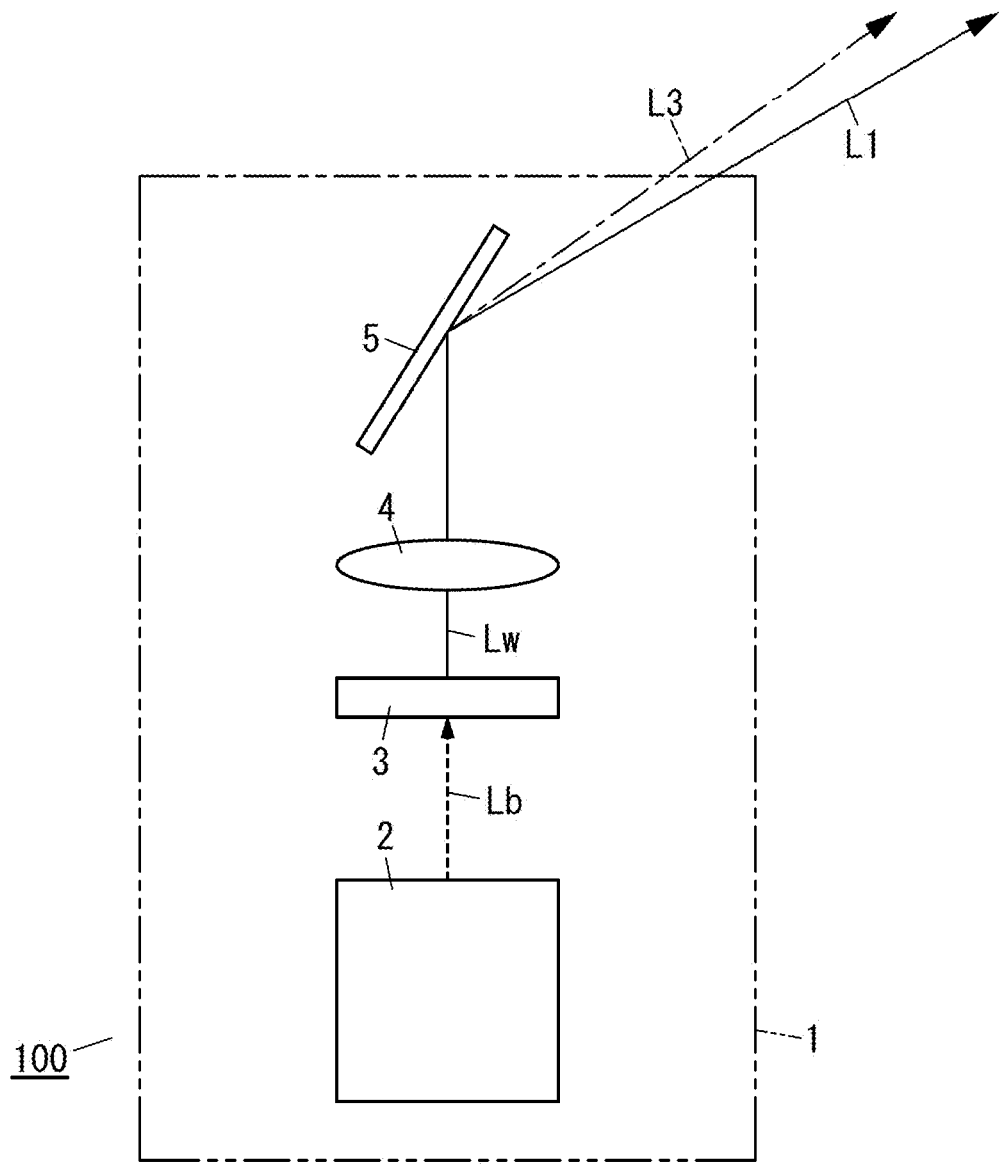
FIG. 2 illustrates an arrangement for a light source unit included in the light system.

The light source unit 1a does not include the mirror 5 of the light source unit 1 (refer to FIG. 2). The light source unit 1a may make the light distribution angle θ1 of the light for lighting L1 and the light distribution angle θ3 of the power feed light L3 different from each other. In this embodiment, the light source unit 1a is configured to be ready to change the distance between the wavelength-converting member 3 and the lens 4a in a direction aligned with the optical axis of the lens 4a. This allows the light source unit 1a to make the light distribution angle θ1 of the light for lighting L1 and the light distribution angle θ3 of the power feed light L3 different from each other by changing the distance between the wavelength-converting member 3 and the lens 4a in the direction aligned with the optical axis of the lens 4a as shown in FIGS. 4A and 4B. The light source unit 1a includes a moving mechanism for changing the distance between the wavelength-converting member 3 and the lens 4a.

In the light source unit 1a, the light distribution angle θ3 of the power feed light L3 and the light distribution angle θ1 of the light for lighting L1 are different from each other. The light distribution angle θ1 of the light for lighting L1 is larger than the light distribution angle θ3 of the power feed light L3. In other words, the light distribution angle θ3 of the power feed light L3 is smaller than the light distribution angle θ1 of the light for lighting L1. In the light system 100 according to the second embodiment, the power feed light L3 and the light for lighting L1 have mutually different light distribution angles. Thus, the light system 100 according to the second embodiment may cause the power feed light L3 and the light for lighting L1 to emerge from the light source unit 1a as two different types of light suitable for their respective purposes.

Figure 5A:
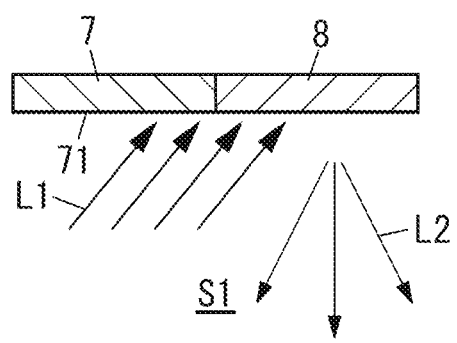
FIG. 5A illustrates a beam size of the light for lighting emerging from the light source unit of the light system.
Figure 5B:
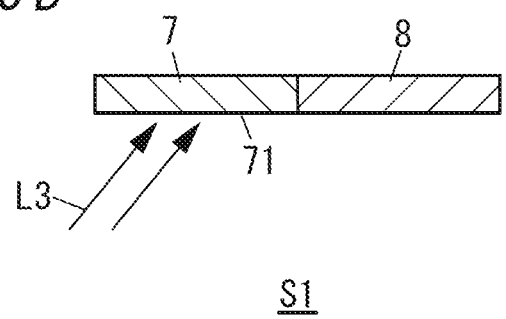
FIG. 5B illustrates a beam size of the power feed light emerging from the light source unit of the light system.

In the light system 100 according to the second embodiment, the light distribution angle θ1 of the light for lighting L1 is larger than the light distribution angle θ3 of the power feed light L3, thus making the irradiation range of the light for lighting L1 broader than the irradiation range of the power feed light L3 as shown in FIGS. 5A and 5B. This allows the light system 100 according to the second embodiment to make the light for lighting L1 incident on not only the light-distributing member 8 but also the photoelectric transducer 7 as well (i.e., incident on both the light-distributing member 8 and the photoelectric transducer 7) as shown in FIG. 5A. Therefore, the light system 100 according to the second embodiment may cause the photoelectric transducer 7 to generate photovoltaic power using a part of the light for lighting L1. Consequently, the light system 100 according to the second embodiment enables the photoelectric transducer 7 to generate photovoltaic power even while the target space S1 is being lighted up with the lighting light L2.

Variation of Second Embodiment

In the light system 100 according to the second embodiment, the light distribution angle θ1 of the light for lighting L1 is larger than the light distribution angle θ3 of the power feed light L3. According to a variation of the second embodiment, having the same configuration as the light system 100 according to the second embodiment, the light distribution angle θ3 of the power feed light L3 is larger than the light distribution angle θ1 of the light for lighting L1. This allows the power feed light L3 to be incident on not only the photoelectric transducer 7 but also the light-distributing member 8 as well (i.e., incident on both the photoelectric transducer 7 and the light-distributing member 8). Thus, this variation of the second embodiment enables generating the lighting light L2 using a part of the power feed light L3.

Third Embodiment

A light system 100 according to a third embodiment includes a light source unit 1b (refer to FIGS. 6A and 6B) instead of the light source unit 1. The basic configuration of the light system 100 according to the third embodiment is the same as that of the light system 100 according to the first embodiment, and therefore, illustration and description thereof will be omitted herein.

The light source unit 1b includes a plurality of (e.g., three in this embodiment) laser light sources 2. The three laser light sources 2 are a red semiconductor laser diode 2R (hereinafter referred to as a "laser light source 2R") for emitting red light Lr, a green semiconductor laser diode 2G (hereinafter referred to as a "laser light source 2G") for emitting green light Lg, and a blue semiconductor laser diode 2B (hereinafter referred to as a "laser light source 2B") for emitting blue light Lb. In this light source unit Tb, the red light Lr, the green light Lg, and the blue light Lb emerge from a housing that houses these three laser light sources 2. The light emerging from the light emerging portion of the light source unit 1b is white light Lw produced as a mixture of the red light Lr, the green light Lg, and the blue light Lb.

The light source unit 1b further includes three mirrors 25R, 25G, 25B provided for the three laser light sources 2R, 2G, 2B, respectively. The housing houses the three laser light sources 2R, 2G, 2B and the three mirrors 25R, 25G, 25B. The mirror 25B reflects the blue light Lb coming from the laser light source 2B toward the mirror 25G. The mirror 25G is a dichroic mirror which reflects the green light Lg coming from the laser light source 2G toward the mirror 25R and transmits the blue light Lb coming from the mirror 25B. The mirror 25R is a dichroic mirror which transmits the red light Lr coming from the laser light source 2R and reflects the blue light Lb and green light Lg coming from the mirror 25G.

In the light source unit Tb, the three laser light sources 2 and the light emerging portion of the housing are optically coupled together by the three mirrors 25R, 25G, 25B.

Alternatively, the light source unit 1b may include a collimator lens for collimating the white light Lw and may be configured to cause the white light Lw collimated by the collimator lens to emerge toward the target space S1.

Figure 6A:
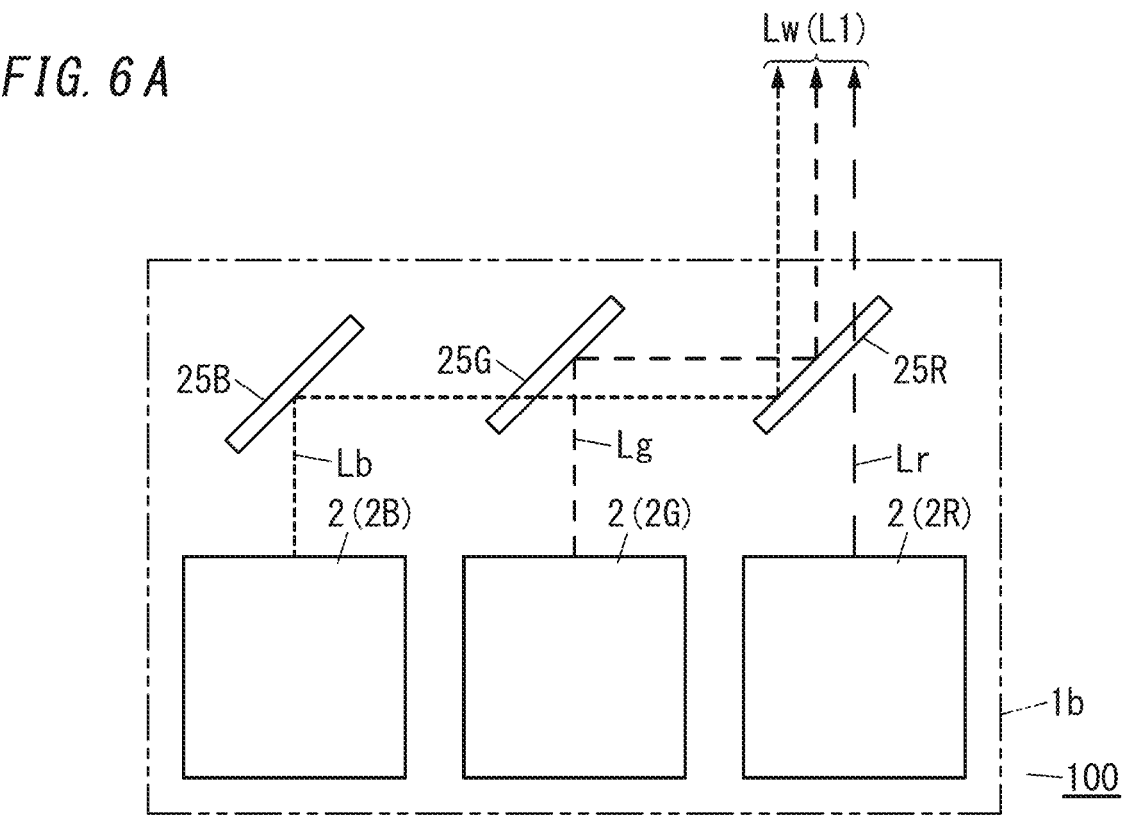
FIG. 6A illustrates light for lighting emerging from a light source unit in a light system according to a third embodiment.
Figure 6B:
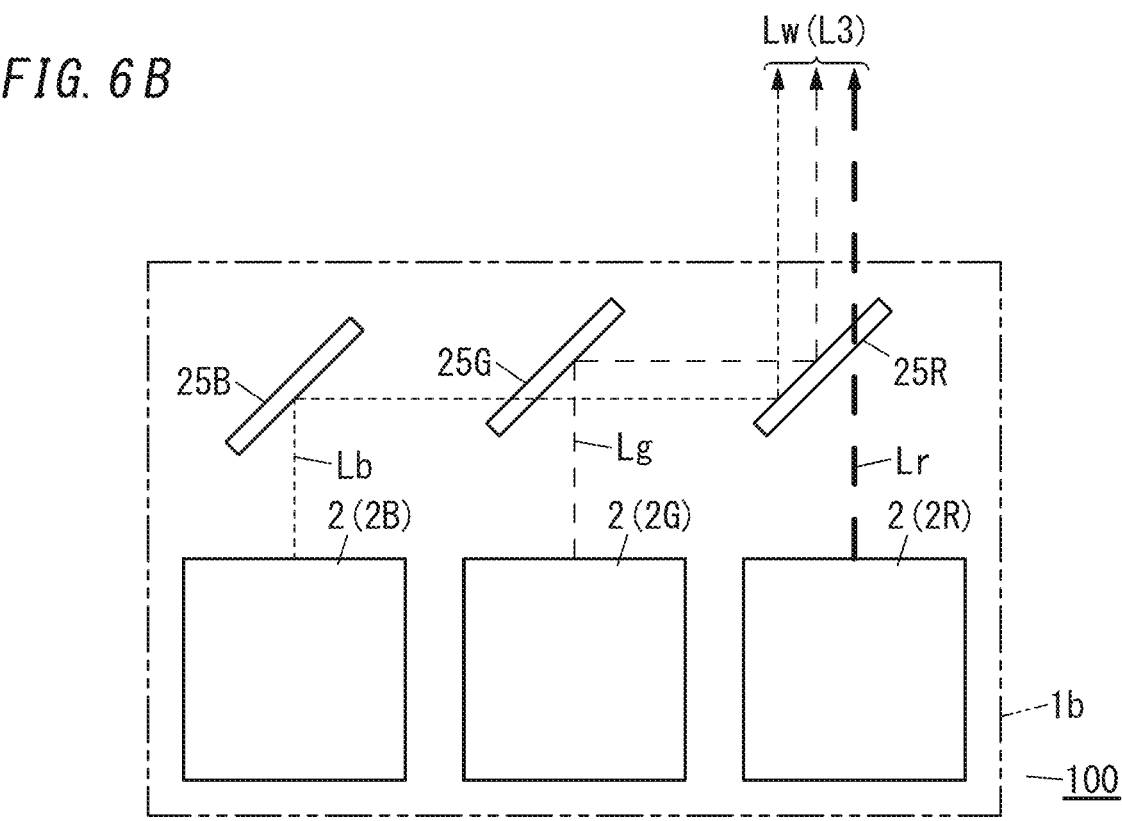
FIG. 6B illustrates power feed light emerging from the light source unit of the light system.

The light system 100 according to the third embodiment includes three driver circuits provided one to one for the three laser light sources 2R, 2G, 2B. In the light system 100 according to the third embodiment, the control unit 9 (refer to FIG. 1) controls the three driver circuits on an individual basis. This allows the light system 100 according to the third embodiment to control the output ratio of the three laser light sources 2R, 2G, 2B. Thus, the light system 100 according to the third embodiment may make the spectrum of the power feed light L3 and the spectrum of the light for lighting L1 different from each other. In the power feed light L3 shown in FIG. 6B, the respective outputs of the blue light Lb and the green light Lg are decreased and the output of the red light Lr is increased compared with the light for lighting L1 shown in FIG. 6A, thus making the spectrum of the power feed light L3 and the spectrum of the light for lighting L1 different from each other. In FIGS. 6A and 6B, the magnitudes of the optical outputs of the blue light Lb, the green light Lg, and the red light Lr are schematically indicated by the line widths of the blue light Lb, the green light Lg, and the red light Lr. A light component having a wavelength which causes an increase in its optical output in the power feed light L3 preferably falls within a wavelength range where the photoelectric transducer 7 achieves high efficiency.

Figure 7:
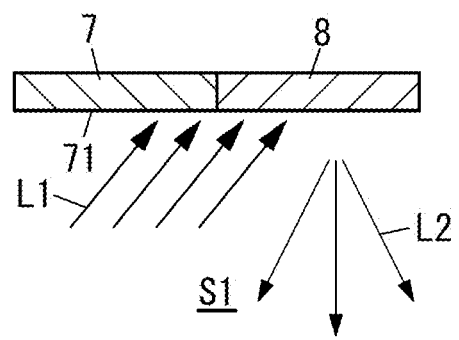
FIG. 7 illustrates how a light system according to a fourth embodiment operates.

The light system 100 according to the third embodiment may make the light for lighting L1 incident on not only the light-distributing member 8 but also the photoelectric transducer 7 as well (i.e., incident on both the light-distributing member 8 and the photoelectric transducer 7) as shown in FIG. 7. Thus, the light system 100 according to the third embodiment may cause the photoelectric transducer 7 to generate photovoltaic power using a part of the light for lighting L1. Consequently, the light system 100 according to the third embodiment may cause the photoelectric transducer 7 to generate photovoltaic power even while the target space S1 is being lighted up with the lighting light L2. The light system 100 according to the third embodiment also makes the power feed light L3 incident on both the photoelectric transducer 7 and the light-distributing member 8.

Optionally, the light system 100 according to the third embodiment, as well as the light system 100 according to the first embodiment, may further include a mirror 5 (refer to FIG. 2) for changing the emerging direction of the white light Lw.

The light source unit 1b includes three laser light sources 2. However, this is only an example and should not be construed as limiting. Alternatively, the light source unit 1b may also include four or more laser light sources 2 that emit light beams in mutually different colors. This allows the light system 100 to improve the color rendering performance of the light (white light Lw) emerging from the light emerging portion of the light source unit 1b.

Fourth Embodiment

A light system 100 according to a fourth embodiment includes a light source unit 1c (refer to FIGS. 8A and 8B) instead of the light source unit 1. The basic configuration of the light system 100 according to the fourth embodiment is the same as that of the light system 100 according to the first embodiment, and therefore, illustration and description thereof will be omitted herein.

The light source unit 1c includes two laser light sources 2 as shown in FIGS. 8A and 8B. In the light source unit 1c, the wavelength-converting member 3 is disposed on the optical axis of a first laser light source 21 out of the two laser light sources 2 but no wavelength-converting member 3 is disposed on the optical axis of the other, second laser light source 22. Each of the first and second laser light sources 21, 22 emits blue light Lb. The wavelength-converting member 3 transforms the blue light Lb emitted from the first laser light source 21 into yellow light Ly and causes the yellow light Ly to emerge therefrom. The light source unit 1c includes a collimator lens which collimates the blue light Lb that has not passed through the wavelength-converting member 3 and the yellow light emerging from the wavelength-converting member 3. The light source unit 1c is configured to cause the white light Lw that has been collimated by the collimator lens to emerge toward the target space S1.

The light system 100 according to the fourth embodiment includes two driver circuits provided one to one for the two laser light sources 2. In the light system 100 according to the fourth embodiment, the control unit 9 (refer to FIG. 1) controls the two driver circuits on an individual basis. This allows the light system 100 according to the fourth embodiment to control the output ratio of the two laser light sources 2. Thus, the light system 100 according to the fourth embodiment may make the spectrum of the power feed light L3 and the spectrum of the light for lighting L1 different from each other. In the power feed light L3 shown in FIG. 8B, the output of the first laser light source 21 is decreased and the output of the second laser light source 22 is increased compared with the light for lighting L1 shown in FIG. 8A, thus making the spectrum of the power feed light L3 and the spectrum of the light for lighting L1 different from each other. In FIGS. 8A and 8B, the magnitudes of the optical outputs of the blue light Lb and the yellow light Ly are schematically indicated by the line widths of the blue light Lb and the yellow light Ly. A light component having a wavelength which causes an increase in its optical output in the power feed light L3 preferably falls within a wavelength range where the photoelectric transducer 7 achieves high efficiency.

The light system 100 according to the fourth embodiment, as well as the light system 100 according to the third embodiment, may also make the light for lighting L1 incident on not only the light-distributing member 8 but also the photoelectric transducer 7 as well (i.e., incident on both the light-distributing member 8 and the photoelectric transducer 7). Thus, the light system 100 according to the fourth embodiment enables the photoelectric transducer 7 to generate photovoltaic power using a part of the light for lighting L1. Consequently, the light system 100 according to the fourth embodiment enables the photoelectric transducer 7 to generate photovoltaic power even while the target space S1 is being lighted up with the lighting light L2.

Optionally, the light system 100 according to the fourth embodiment, as well as the light system 100 according to the first embodiment, may further include a mirror 5 (refer to FIG. 2) for changing the emerging direction of the white light Lw.

Fifth Embodiment

Figure 9:
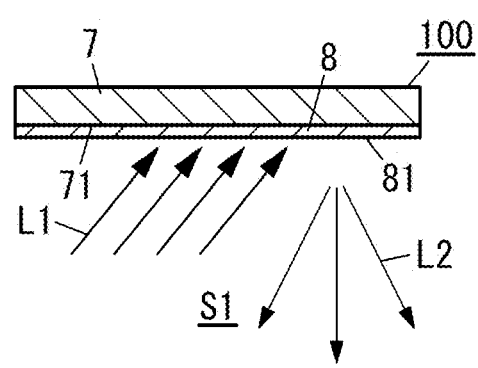
FIG. 9 is a cross-sectional view of a light-distributing member and a photoelectric transducer included in a light system according to a sixth embodiment.
Figure 10:
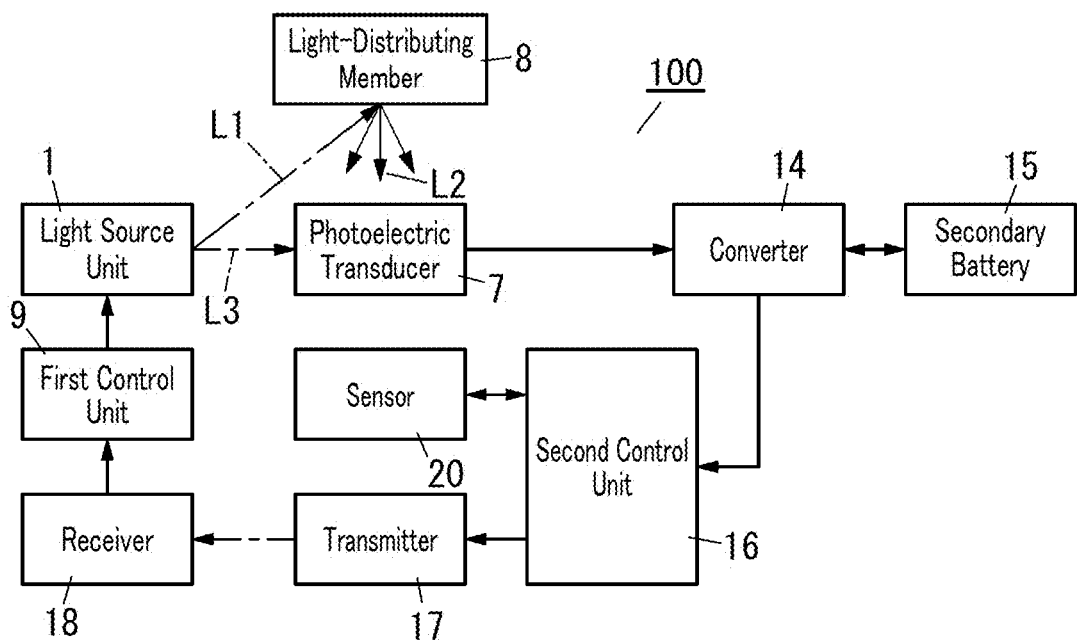
FIG. 10 is a block diagram of a light system according to a seventh embodiment.

In a light system 100 according to a fifth embodiment, the photoelectric transducer 7 and the light-distributing member 8 are stacked one on top of the other as shown in FIG. 9, which is a difference from the light system 100 according to the first embodiment. The basic configuration of the light system 100 according to the fifth embodiment is the same as that of the light system 100 according to the first embodiment, and therefore, illustration and description thereof will be omitted herein.

In the light system 100 according to the fifth embodiment, the light-distributing member 8 is laid on top of the photoelectric transducer 7. The light-distributing member 8 is disposed on a light incident surface 71 of the photoelectric transducer 7. In the light system 100 according to the fifth embodiment, the light-distributing member 8 and the photoelectric transducer 7 are arranged such that the light-distributing member 8 faces the target space S1 out of the light-distributing member 8 and the photoelectric transducer 7.

In the light system 100 according to the fifth embodiment, the power feed light L3 is incident on the photoelectric transducer 7 via the light-distributing member 8. That is to say, in the light system 100 according to the fifth embodiment, the reflectance of the light-distributing member 8 is determined to cause only a part of the light for lighting L1 incident on the light incident surface 81 of the light-distributing member 8 to be diffuse-reflected from the light-distributing member 8 and radiated as the lighting light L2 toward the target space S1 and to cause at least a part of the rest of the light for lighting L1 incident on the light incident surface 81 of the light-distributing member 8 to be transmitted through the light-distributing member 8 and eventually reach the photoelectric transducer 7 as the power feed light L3. The light system 100 according to the fifth embodiment may align the emerging direction of the power feed light L3 with the emerging direction of the light for lighting L1. In addition, the light system 100 according to the fifth embodiment may also reduce the area occupied by a member including the light-distributing member 8 and the photoelectric transducer 7 as viewed from the target space S1, thus making the design of the light system 100 neat and tidy.

Sixth Embodiment

A light system 100 according to a sixth embodiment includes a sensor 20 supplied with power by the photoelectric transducer 7, which is a difference from the light system 100 according to the first embodiment. In the following description, any constituent element of the light system 100 according to this sixth embodiment, having the same function as a counterpart of the light system 100 according to the first embodiment described above, will be designated by the same reference numeral as that counterpart's, and description thereof will be omitted herein.

The light system 100 according to the sixth embodiment includes the light source unit 1, the photoelectric transducer 7, the light-distributing member 8, a first control unit 9 serving as the control unit 9 for controlling the light source unit 1, a secondary battery 15, a bidirectional converter 14 for making power conversion between the photoelectric transducer 7 and the secondary battery 15, a transmitter 17, a receiver 18, the sensor 20, and a second control unit 16.

The sensor 20 may be, for example, a human detection sensor for detecting the presence of a person 19 (refer to FIG. 1) in the target space S1 (refer to FIG. 1). However, this is only an example and should not be construed as limiting. Alternatively, the sensor 20 may also be, for example, a smoke detection sensor for detecting the presence of smoke in the target space S1.

The second control unit 16 makes the transmitter 17 transmit a control signal representing the result of detection by the sensor 20. The receiver 18 receives the control signal from the transmitter 17 and passes the control signal to the first control unit 9. This allows the first control unit 9 to control the light source unit 1 based on the result of detection by the sensor 20.

The light system 100 according to the sixth embodiment achieves the advantages of eliminating the need to externally supply power, via a cable, to the sensor 20 mounted on, for example, the ceiling of a facility or to provide a battery that needs a replacement such as a primary battery.

Optionally, the light system 100 may supply the photovoltaic power, generated by the photoelectric transducer 7, to the sensor 20 directly not via the secondary battery 15.

Seventh Embodiment

Figure 11:
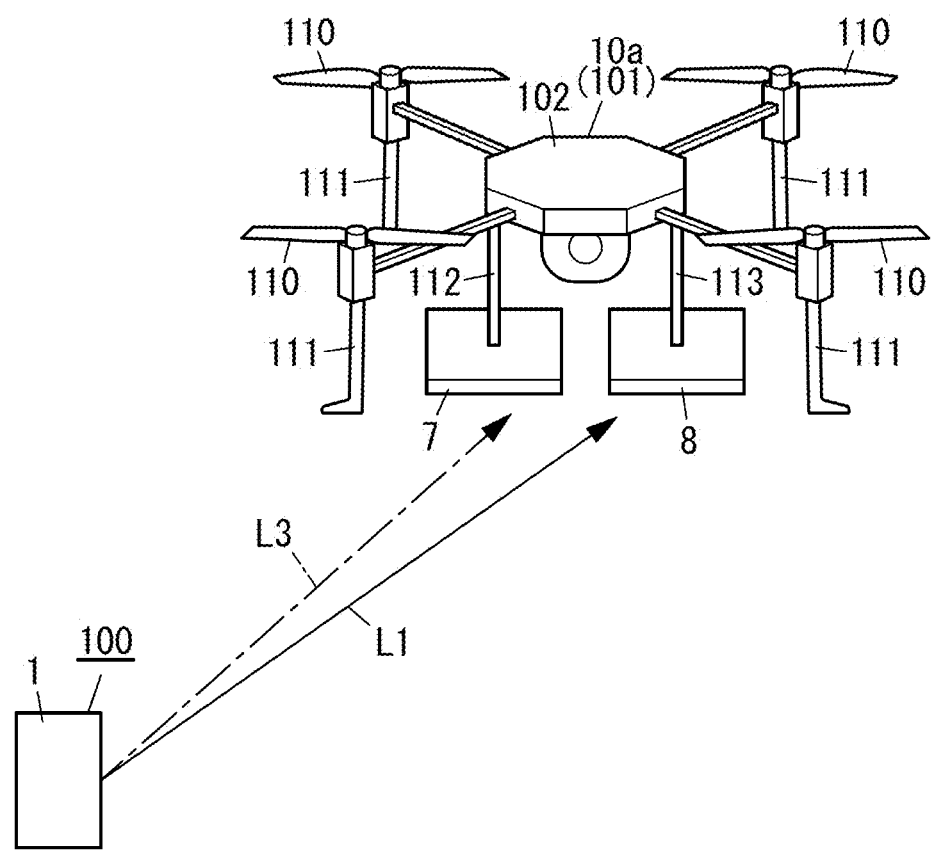
FIG. 11 illustrates a configuration for a light system according to an eighth embodiment.

A light system 100 according to a seventh embodiment includes a holding member 10a (refer to FIG. 11) instead of the holding member 10 (refer to FIG. 1) of the light system 100 according to the first embodiment. The holding member 10a is a moving vehicle 101. The basic configuration of the light system 100 according to the seventh embodiment is the same as that of the light system 100 according to the first embodiment, and therefore, illustration and description thereof will be omitted herein.

The moving vehicle 101 serving as the holding member 10a may be, for example, a drone, which is a type of a flight vehicle. The drone operates in accordance with remote control by an administrative station. Examples of the administrative station include a personal computer and a server.

In the light system 100 according to the seventh embodiment, when the moving vehicle 101 is temporarily at a stop, the power feed light L3 is projected from the light source unit 1 toward the photoelectric transducer 7. The photovoltaic power generated by the photoelectric transducer 7 may be used, for example, to charge a secondary battery for use as a power supply for the moving vehicle 101. Optionally, in the light system 100 according to the seventh embodiment, while the moving vehicle 101 is moving (i.e., while the drone is flying), the power feed light L3 may also be projected from the light source unit 1 toward the photoelectric transducer 7 to charge the secondary battery for use as a power supply for the moving vehicle 101. Thus, the light system 100 according to the seventh embodiment allows the drone that provides lighting light to keep flying for a longer time by supplying power to the drone while making the flying drone cast the lighting light L2.

The moving vehicle 101 includes a body 102, a plurality of (e.g., four) propellers 110, a plurality of (e.g., four) driving units (such as motors) for driving the plurality of propellers 110, a controller for controlling the plurality of driving units, a plurality of (e.g., four) legs 111, a holding arm 112 that holds the photoelectric transducer 7, and a holding arm 113 that holds the light-distributing member 8. The moving vehicle 101 further includes a camera, a GPS sensor, a gyrosensor, an acceleration sensor, an electronic compass, a wireless communications unit, and other components.

The light system 100 according to the seventh embodiment may make optical wireless power transmission for the moving vehicle 101. In addition, the light system 100 according to the seventh embodiment may also change the area to be lighted up with the lighting light L2 by making the light for lighting L1 incident on the light-distributing member 8 either after the moving vehicle 101 has been moved to a desired position or while the moving vehicle 101 is moving.

Eighth Embodiment

Figure 12A:
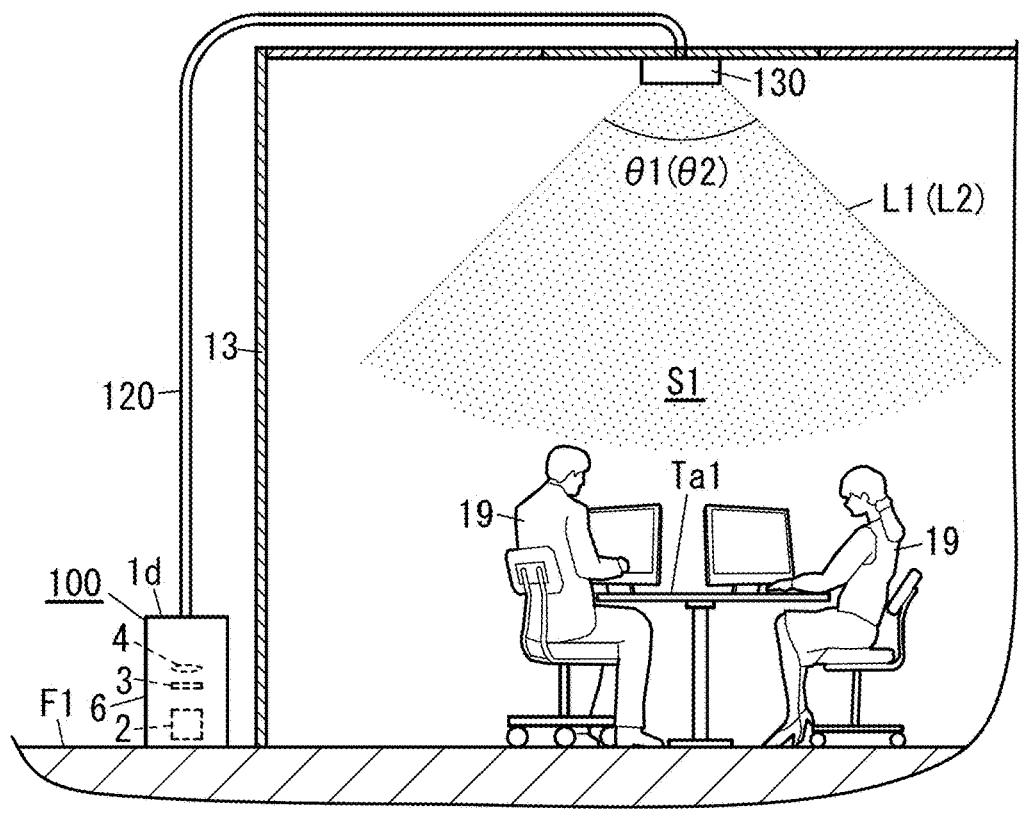
FIG. 12A illustrates light for lighting emerging from a light source unit in a light system according to a ninth embodiment.
Figure 12B:
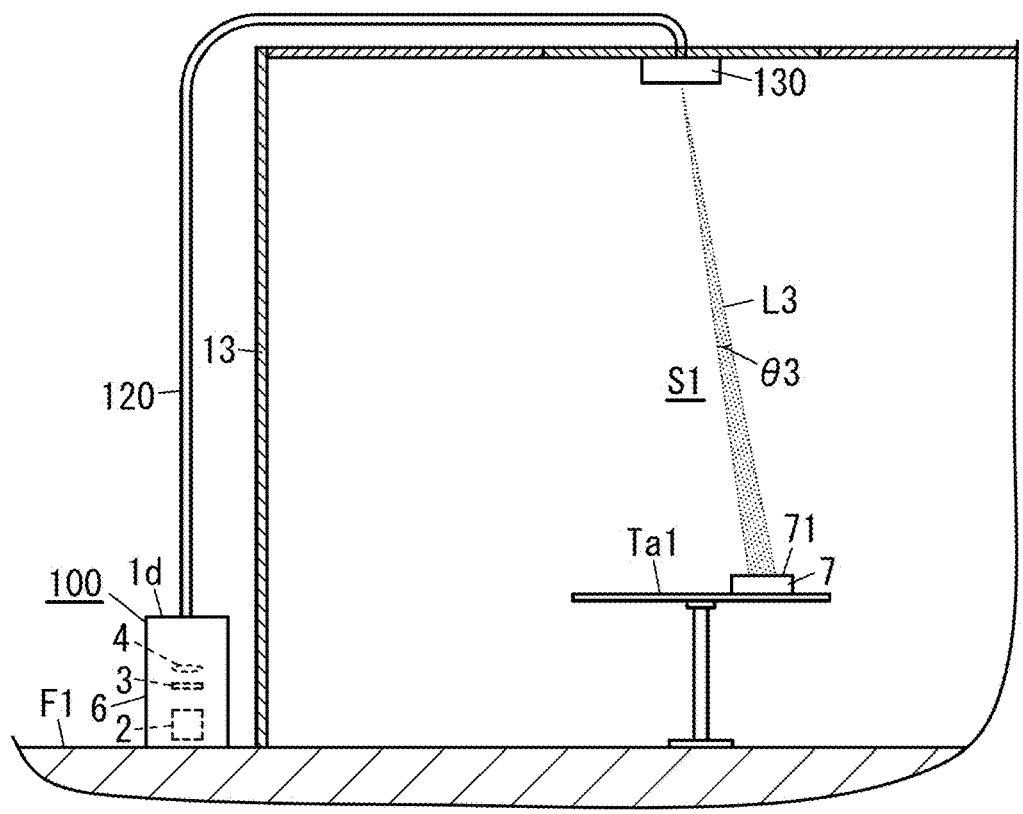
FIG. 12B illustrates power feed light emerging from the light source unit of the light system.

A light system 100 according to an eighth embodiment includes a light source unit 1*d* as shown in FIGS. 12A and 12B instead of the light source unit 1 (refer to FIGS. 1 and 2) of the light system 100 according to the first embodiment, which is a difference from the light system 100 according to the first embodiment. In the following description, any constituent element of the light system 100 according to this eighth embodiment, having the same function as a counterpart of the light system 100 according to the first embodiment described above, will be designated by the same reference numeral as that counterpart's, and description thereof will be omitted herein.

The light source unit 1*d* does not include the mirror 5 of the light source unit 1 (refer to FIG. 2). The light source unit 1*d* further includes an optical fiber 120 which propagates the white light Lw (refer to FIG. 2) collimated by the lens 4 and a projection unit 130 which projects, toward the target space S1, the white light Lw propagated by the optical fiber 120. The projection unit 130 has the function of projecting the light for lighting L1 as the lighting light L2 as shown in FIG. 12A and the function of projecting the power feed light L3 toward the target space S1 as shown in FIG. 12B. The projection unit 130 includes a lens facing the light emerging surface of the optical fiber 120. Changing the distance between the light emerging surface of the optical fiber 120 and the lens may not only make the light distribution angle θ1 of the light for lighting L1 and the light distribution angle θ3 of the power feed light L3 different from each other but also make the light distribution angle θ1 of the light for lighting L1 the same as the light distribution angle θ2 of the lighting light L2. In the light system 100 according to the eighth embodiment, the photoelectric transducer 7 (refer to FIG. 12B) may be disposed, for example, on the table Ta1, which is to be used by persons 19 as users of the facility, while no persons 19 are at the table Ta1.

In addition, the projection unit 130 further includes a mirror which reflects the light emerging from the light emerging surface of the optical fiber 120. The respective emerging directions of the lighting light L2 and the power feed light L3 may be made different from each other by controlling the scanning angle of the mirror.

In the light system 100 according to the eighth embodiment, the light source unit 1*d* has the function of causing the power feed light L3 to emerge toward the target space S1 and the function of causing the light for lighting L1 to emerge as the lighting light L2 toward the target space S i. Thus, the light system 100 according to the eighth embodiment allows the light source unit 1*d* to directly light up the target space S1.

Other Variations

Note that the first to eighth embodiments described above are only exemplary ones of various embodiments of the present disclosure and should not be construed as limiting. Rather, the first to eighth exemplary embodiments may be readily modified in various manners depending on a design choice or any other factor without departing from the scope of the present disclosure.

For example, in the light system 100 according to the first embodiment, the holding member 10 does not have to include the ceiling member 11 but may also include beams, for example.

Also, in the light system 100 according to the first embodiment, the laser light source 2 does not have to be the semiconductor laser diode that emits the blue laser beam but may also be, for example, a semiconductor laser diode which emits a violet laser beam. In that case, the wavelength-converting member 3 preferably contains blue phosphor particles, yellow phosphor particles, green phosphor particles, and red phosphor particles. The blue phosphor particles are excited by, for example, a violet laser beam to radiate blue light. The yellow phosphor particles are excited by, for example, a violet laser beam to radiate yellow light. The green phosphor particles are excited by, for example, a violet laser beam to radiate green light. The red phosphor particles are excited by, for example, a violet laser beam to radiate red light.

Furthermore, in the light system 100 according to the first embodiment, the shortest distance between the photoelectric transducer 7 and the light source unit 1 is shorter than the shortest distance between the light-distributing member 8 and the light source unit 1. However, this is only an example and should not be construed as limiting. Alternatively, for example, the shortest distance between the light-distributing member 8 and the light source unit 1 may be shorter than the shortest distance between the photoelectric transducer 7 and the light source unit 1. Still alternatively, the shortest distance between the light-distributing member 8 and the light source unit 1 may be the same as the shortest distance between the photoelectric transducer 7 and the light source unit 1.

Optionally, in the light system 100 according to the first embodiment, the control unit 9 may control the light source unit 1 following a preset schedule.

Aspects

The exemplary embodiments and their variations described above are specific implementations of the following aspects of the present disclosure.

A light system (100) according to a first aspect includes a light source unit (1; 1*a*; 1*b*; 1*c*; 1*d*) including a laser light source (2), and a photoelectric transducer (7) having the ability to generate photovoltaic power. The photoelectric transducer (7) generates the photovoltaic power when receiving power feed light (L3) emerging from the light source unit (1; 1*a*; 1*b*; 1*c*; 1*d*). The light source unit (1; 1*a*; 1*b*; 1*c*; 1*d*) may cause the power feed light (L3) and light for lighting (L1) for lighting up a target space (S1) to emerge from the light source unit (1; 1*a*; 1*b*; 1*c*; 1*d*) itself. The power feed light (L3) is to be incident on the photoelectric transducer (7).

The light system (100) according to the first aspect may make both optical wireless power transmission and lighting.

A light system 100 according to a second aspect, which may be implemented in conjunction with the first aspect, further includes a light-distributing member (8). The light-distributing member (8) reflects at least a part of the light for lighting (L1) and thereby transforms at least the part of the light for lighting (L1) into lighting light (L2) having a different light distribution characteristic from the light for lighting (L1) to have the lighting light (L2) distributed over the target space (S1).

The light system (100) according to the second aspect may provide lighting light (L2) with controlled light distribution for the target space (S1) without using any lighting fixture.

A light system (100) according to a third aspect, which may be implemented in conjunction with the second aspect, further includes a holding member (10; 10a) that holds the photoelectric transducer (7) and the light-distributing member (8).

The light system (100) according to the third aspect may have relative positions of the photoelectric transducer (7) and the light-distributing member (8) determined by the holding member (10; 10a).

In a light system (100) according to a fourth aspect, which may be implemented in conjunction with the third aspect, the photoelectric transducer (7) and the light-distributing member (8) are adjacent to each other.

The light system (100) according to the fourth aspect may reduce the angle formed between the emerging direction of the power feed light (L3) and the emerging direction of the light for lighting (L1) compared to a situation where the photoelectric transducer (7) and the light-distributing member (8) are arranged so distant from each other as to allow another member to be interposed between the photoelectric transducer (7) and the light-distributing member (8).

In a light system (100) according to a fifth aspect, which may be implemented in conjunction with the third or fourth aspect, the holding member (10; 10a) includes a ceiling member (11) facing the target space (S1).

The light system (100) according to the fifth aspect achieves the advantage of making it easier to light up the target space (S1) with the lighting light (L2) and providing natural lighting for a person (19) without allowing him or her find the lighting unnatural.

In a light system (100) according to a sixth aspect, which may be implemented in conjunction with the third or fourth aspect, the holding member (10a) is a moving vehicle (101).

The light system (100) according to the sixth aspect may make optical wireless power transmission for the moving vehicle (101) and may also change the area to light up with the lighting light (L2) by causing the moving vehicle (101) to move.

In a light system (100) according to a seventh aspect, which may be implemented in conjunction with the second aspect, the light-distributing member (8) is laid on top of the photoelectric transducer (7). The power feed light (L3) is incident on the photoelectric transducer (7) via the light-distributing member (8).

The light system (100) according to the seventh aspect may align the emerging direction of the power feed light (L3) with the emerging direction of the light for lighting (L1). In addition, the light system (100) according to the seventh aspect may also reduce the area occupied by a member including the light-distributing member (8) and the photoelectric transducer (7) as viewed from the target space (S1), thus making the design of the light system (100) neat and tidy.

A light system (100) according to an eighth aspect, which may be implemented in conjunction with any one of the second to seventh aspects, further include a control unit (9) that controls the light source unit (1). The control unit (9) has the functions of: controlling the light source unit (1) to cause only the power feed light (L3) to emerge from the light source unit (1) out of the power feed light (L3) and the light for lighting (L1); and controlling the light source unit (1) to cause only the light for lighting (L1) to emerge from the light source unit (1) out of the power feed light (L3) and the light for lighting (L1).

The light system (100) according to the eighth aspect may change the control mode from the mode in which only the power feed light (L3) is allowed to emerge from the light source unit (1) to the mode in which only the light for lighting (L1) is allowed to emerge from the light source unit (1), and vice versa. This allows the control of allowing only the power feed light (L3) to emerge from the light source unit (1) and the control of allowing only the light for lighting (L1) to emerge from the light source unit (1) to be performed in mutually different time slots.

In a light system (100) according to a ninth aspect, which may be implemented in conjunction with any one of the second to eighth aspects, the power feed light (L3) and the light for lighting (L1) have different spectra, different emerging directions, and/or different light distribution angles.

The light system (100) according to the ninth aspect may cause the power feed light (L3) and the light for lighting (L1) to emerge from the light source unit (1) as two different types of light suitable for their respective purposes.

In a light system (100) according to a tenth aspect, which may be implemented in conjunction with any one of the first to seventh aspects, the power feed light (L3) and the light for lighting (L1) are identical with each other.

The light system (100) according to the tenth aspect may reduce the number of components of the light source unit (1) compared to a situation where the power feed light (L3) and the light for lighting (L1) are two different types of light.

In a light system (100) according to an eleventh aspect, which may be implemented in conjunction with the first aspect, the light source unit (1d) has the functions of: causing the power feed light (L3) to emerge toward the target space (S1); and causing the light for lighting (L1) to emerge as lighting light (L2) toward the target space (S1).

The light system (100) according to the eleventh aspect allows the light source unit (1d) to directly light up the target space (S1).

A light system (100) according to a twelfth aspect, which may be implemented in conjunction with any one of the first to eleventh aspects, further includes a sensor (20) to be supplied with electric power by the photoelectric transducer (7).

The light system (100) according to the twelfth aspect allows the photovoltaic power generated by the photoelectric transducer (7) to be used as a power source for the sensor (20).

REFERENCE SIGNS LIST 1, 1a, 1b, 1c, 1d Light Source Unit
2 Laser Light Source
3 Wavelength-Converting Member
4 Lens
5 Mirror
7 Photoelectric Transducer
8 Light-Distributing Member
9 Control Unit
10 Holding Member
11 Ceiling Member
10a Holding Member
20 Sensor
100 Light system
101 Moving Vehicle
L1 Light for Lighting L2 Lighting Light
L3 Power Feed Light
S1 Target Space

The invention claimed is:

1. A light system comprising:
a light source unit including a laser light source; and
a photoelectric transducer having the ability to generate photovoltaic power,
the photoelectric transducer being configured to generate the photovoltaic power when receiving power feed light emerging from the light source unit,
the light source unit being able to cause the power feed light and light for lighting for lighting up a target space to emerge from the light source unit itself, the power feed light being to be incident on the photoelectric transducer,
the light system further comprising:
a light-distributing member configured to reflect at least a part of the light for lighting and thereby transform at least the part of the light for lighting into lighting light having a different light distribution characteristic from the light for lighting to have the lighting light distributed over the target space; and
a holding member that holds the photoelectric transducer and the light-distributing member.

2. The light system of claim 1, wherein
the photoelectric transducer and the light-distributing member are adjacent to each other.

3. The light system of claim 1, wherein
the holding member includes a ceiling member facing the target space.

4. The light system of claim 1, wherein
the holding member is a moving vehicle.

5. The light system of claim 1, further comprising a control unit configured to control the light source unit, wherein
the control unit has the functions of:
controlling the light source unit to cause only the power feed light to emerge from the light source unit out of the power feed light and the light for lighting; and
controlling the light source unit to cause only the light for lighting to emerge from the light source unit out of the power feed light and the light for lighting.

6. The light system of claim 1, wherein
the power feed light and the light for lighting have different spectra, different emerging directions, and/or different light distribution angles.

7. The light system of claim 1, wherein
the power feed light and the light for lighting are identical with each other.

8. The light system of claim 1, further comprising a sensor configured to be supplied with electric power by the photoelectric transducer.

9. A light system comprising:
a light source unit including a laser light source; and
a photoelectric transducer having the ability to generate photovoltaic power,
the photoelectric transducer being configured to generate the photovoltaic power when receiving power feed light emerging from the light source unit,
the light source unit being able to cause the power feed light and light for lighting for lighting up a target space to emerge from the light source unit itself, the power feed light being to be incident on the photoelectric transducer,
the light system further comprising a light-distributing member configured to reflect at least a part of the light for lighting and thereby transform at least the part of the light for lighting into lighting light having a different light distribution characteristic from the light for lighting to have the lighting light distributed over the target space,
wherein
the light-distributing member is disposed on a light incident surface of the photoelectric transducer, and
the power feed light is incident on the photoelectric transducer via the light-distributing member.

* * * * *